United States Patent
Harada et al.

(10) Patent No.: US 12,328,688 B2
(45) Date of Patent: Jun. 10, 2025

(54) TERMINAL FOR PERFORMING ACCESS TO NETWORK BY USING SYNCHRONIZATION SIGNAL BLOCK

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 311 days.

(21) Appl. No.: 17/597,118

(22) PCT Filed: Jun. 27, 2019

(86) PCT No.: PCT/JP2019/025754
§ 371 (c)(1),
(2) Date: Dec. 27, 2021

(87) PCT Pub. No.: WO2020/261524
PCT Pub. Date: Dec. 30, 2020

(65) Prior Publication Data
US 2022/0272643 A1    Aug. 25, 2022

(51) Int. Cl.
*H04W 56/00*    (2009.01)
(52) U.S. Cl.
CPC .................................. *H04W 56/00* (2013.01)
(58) Field of Classification Search
CPC ..................................................... H04W 56/00
See application file for complete search history.

(56) References Cited

U.S. PATENT DOCUMENTS

| | | | | |
|---|---|---|---|---|
| 2019/0081721 A1* | 3/2019 | Ly | ........................ | H04B 7/0695 |
| 2020/0045726 A1* | 2/2020 | Ly | ........................ | H04W 48/12 |
| 2020/0295896 A1* | 9/2020 | Xiong | ................. | H04L 27/2613 |
| 2021/0160117 A1* | 5/2021 | Xiong | ................. | H04L 27/2602 |
| 2022/0232471 A1* | 7/2022 | Laselva | ................. | H04W 24/10 |

FOREIGN PATENT DOCUMENTS

| | | | | |
|---|---|---|---|---|
| CN | 109560904 A | | 4/2019 | |
| CN | 111096005 A | * | 5/2020 | ........... H04B 7/0695 |
| EP | 3 500 004 A1 | | 6/2019 | |
| KR | 20190006297 A | * | 1/2019 | |
| WO | 2019028882 A1 | | 2/2019 | |

OTHER PUBLICATIONS

MediaTek Inc .; "Views on multi-CC QCL assumptions"; 3GPP TSG RAN WG1 Meeting #92bis, R1-1804060; Sanya, China; Apr. 16-20, 2018 (5 pages).

(Continued)

*Primary Examiner* — Saad A. Waqas
(74) *Attorney, Agent, or Firm* — Osha Bergman Watanabe & Burton LLP

(57) ABSTRACT

A terminal receives a synchronization signal block (SSB) in a different frequency band different from a frequency band including one or a plurality of frequency ranges. The synchronization signal block (SSB) receives at least one of a plurality of synchronization signal blocks (SSB) having different indexes and transmitted from a network by using the same time position or the same frequency position.

2 Claims, 13 Drawing Sheets

(56) References Cited

OTHER PUBLICATIONS

Extended European Search Report issued in European Application No. 19934498.7, dated Dec. 16, 2022 (10 pages).
International Search Report for corresponding International Application No. PCT/JP2019/025754, mailed Jan. 28, 2020 (5 pages).
Written Opinion for corresponding International Application No. PCT/JP2019/025754, mailed Jan. 28, 2020 (3 pages).
Vivo; "Discussion on enhancements to initial access procedure"; 3GPP TSG RAN WG1 #97, R1-1906131; Reno, USA; May 13-17, 2019 (9 pages).
3GPP TR 38.807 V0.1.0; "3rd Generation Partnership Project; Technical Specification Group Radio Access Network; Study on requirements for NR beyond 52.6 GHZ (Release 16)"; Mar. 2019 (44 pages).
3GPP TS 38.133 V15.5.0; "3rd Generation Partnership Project; Technical Specification Group Radio Access Network; NR; Requirements for support of radio resource management (Release 15)"; Mar. 2019 (892 pages).

* cited by examiner

TERMINAL FOR PERFORMING ACCESS TO NETWORK BY USING SYNCHRONIZATION SIGNAL BLOCK

TECHNICAL FIELD

The present invention relates to a terminal that performs radio communication and particularly, relates to a terminal that receives synchronization signal block (SSB).

BACKGROUND ART

The 3rd Generation Partnership Project (3GPP) specifies Long Term Evolution (LTE), and with the aim of further speeding, specifies LTE-Advanced (hereinbelow, the LTE includes the LTE-Advanced). In the 3GPP, specifications for 5th generation mobile communication system (5G, also called as New Radio (NR) or Next Generation (NG)) are also being considered.

In Release 15 and Release 16 (NR) of the 3GPP, the operation of the bands including FR1 (410 MHz to 7.125 GHz) and FR2 (24.25 GHz to 52.6 GHz) is specified. In addition, in the specifications after Release 16, operation in a band exceeding 52.6 GHz has been studied (see Non-Patent Document 1). The target frequency range in Study Item (SI) is 52.6 GHz to 114.25 GHz.

In the NR, the measurement of reception quality is performed by using SSB (SS/PBCH Block) composed of synchronization signal (SS: Synchronization Signal) and downlink physical broadcast channel (PBCH: Physical Broadcast Channel) (Non-Patent Document 2). A transmission cycle of the SSB can be set for each cell in the range of 5, 10, 20, 40, 80, 160 milliseconds (assuming that a transmission cycle of a terminal of an initial access (User Equipment, UE) is 20 milliseconds).

The transmission of the SSB within the transmission cycle time is limited to within 5 milliseconds (half frame) and each SSB can be associated with a different beam. In Release 15, the number of SSB indexes is 64 (0 to 63 indexes).

PRIOR ART DOCUMENT

Non-Patent Document

Non-Patent Document 1: 3GPP TR 38.807 V0.1.0, 3rd Generation Partnership Project; Technical Specification Group Radio Access Network; Study on requirements for NR beyond 52.6 GHz (Release 16), 3GPP, March 2019

Non-Patent Document 2: 3GPP TS 38.133 V15.5.0, 3rd Generation Partnership Project; Technical Specification Group Radio Access Network; NR; Requirements for support of radio resource management (Release 15), 3GPP, March 2019

SUMMARY OF THE INVENTION

When using a different frequency band different from FR1/FR2, such as the above high frequency band exceeding 52.6 GHz, in order to cope with a wide bandwidth and a large propagation loss, it is necessary to generate a narrower beam by using a large (massive) antenna having a large number of antenna elements. That is, a large number of beams are required to cover a certain geographical area.

For this reason, when a time division (TDM) beam sweeping method that can handle analog beamforming as defined in Release 15 is applied to SSB as it is, the following problems can arise.

Specifically, efficient SSB transmission is limited, and there is a possibility of an increase in the overhead related to SSB signaling. In addition, restriction also occurs on the beam used for data transmission due to the beam sweeping for SSB transmission and this may increase a data scheduling delay to the terminal. Also, a measurement time and power consumption may increase when measuring initial access and neighboring cell quality.

The present invention has been made in view of the above discussion. One object of the present invention is to provide a terminal capable of suppressing overhead related to SSB signaling and reducing a data scheduling delay, SSB detection/measurement time, and power consumption even when using a frequency band different from FR1/FR2.

According to one aspect of the present disclosure a terminal (UE 200) includes a receiving unit (radio signal transmitting and receiving unit 210) that receives a synchronization signal block (SSB) in a different frequency band (e.g., FR4) that is different from a frequency band including one or a plurality of frequency ranges (FR1, FR2); and a control unit (control unit 270) that performs access to a network by using the synchronization signal block. The receiving unit receives at least one of a plurality of synchronization signal blocks transmitted from the network by using the same time position or the same frequency position and having different pseudo-collocation assumptions.

MODES FOR CARRYING OUT THE INVENTION

Figure 1:
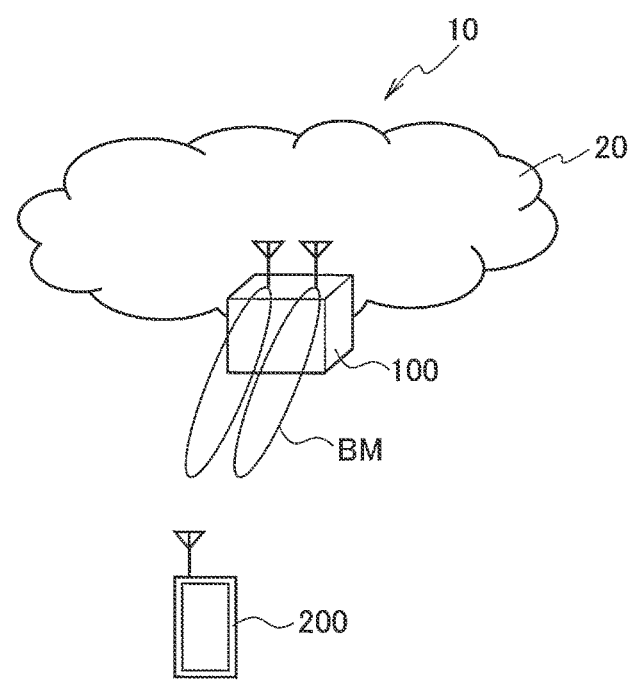
FIG. 1 is an overall schematic configuration diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of Radio Communication System

FIG. 1 is an overall schematic configuration diagram of a radio communication system 10 according to the present embodiment. The radio communication system 10 is a radio communication system according to 5G New Radio (NR). The radio communication system 10 includes Next Generation-Radio Access Network 20 (hereinafter, "NG-RAN 20") and a terminal 200 (hereinafter, "UE 200").

The NG-RAN 20 includes a radio base station 100 (hereinafter, "gNB 100"). A concrete configuration of the radio communication system 10, including the number of the gNBs and the UEs, is not limited to the example shown in FIG. 1.

The NG-RAN 20 actually includes a plurality of NG-RAN Nodes, in particular, the gNBs (or ng-eNB). Also, the NG-RAN 20 is connected to a core network (5GC, not shown) according to the 5G. The NG-RAN 20 and the 5GC may be simply expressed as "network".

The gNB 100 is a radio base station according to the 5G. The gNB 100 performs a radio communication with the UE 200 according to the 5G. The gNB 100 and the UE 200 can handle, by controlling a radio signal transmitted from a plurality of antenna elements, Massive MIMO (Multiple-Input Multiple-Output) that generates a beam BM with a higher directivity, carrier aggregation (CA) that bundles a plurality of component carriers (CC) to use, dual connectivity (DC) in which communication is performed simultaneously between two NG-RAN Nodes and the UE, and the like.

Figure 2:
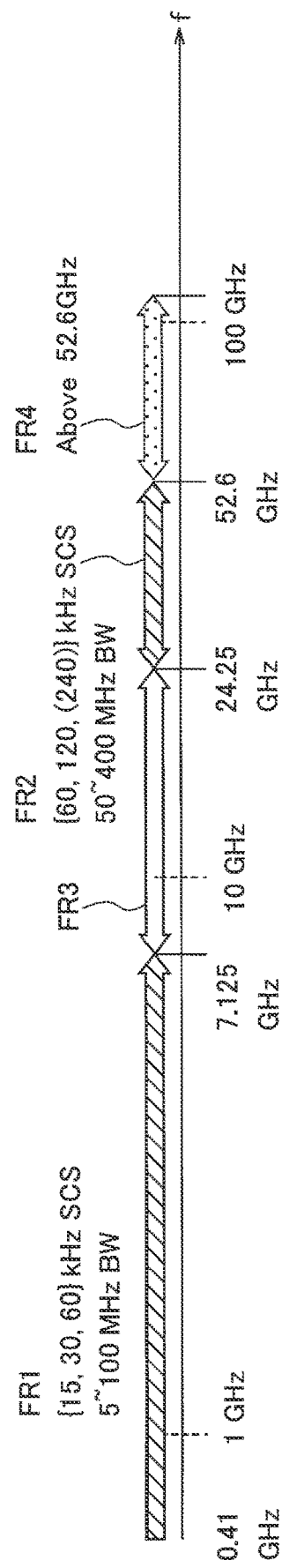
FIG. 2 is a diagram showing a frequency range used in the radio communication system 10.

The radio communication system 10 corresponds to a plurality of frequency ranges (FR). FIG. 2 shows the frequency range used in the radio communication system 10.

As shown in FIG. 2, the radio communication system 10 corresponds to FR1 and FR2. The frequency band of each FR is as below.

FR1: 410 MHz to 7.125 GHz
FR2: 24.25 GHz to 52.6 GHz

In FR1, 15 kHz, 30 kHz, or 60 kHz Sub-Carrier Spacing (SCS) is used, and a bandwidth (BW) of 5 MHz to 100 MHz is used. FR2 has a higher frequency than FR1. Moreover, FR2 uses SCS of 60 kHz or 120 kHz (240 kHz may be included), and uses a bandwidth (BW) of 50 MHz to 400 MHz.

Note that SCS may be interpreted as numerology. The numerology is defined in 3GPP TS38.300 and corresponds to one subcarrier spacing in the frequency domain.

Furthermore, the radio communication system 10 can handle to a frequency band that is higher than the frequency band of FR2. Specifically, the radio communication system 10 can handle a frequency band exceeding 52.6 GHz and up to 114.25 GHz. Here, such a high frequency band is referred to as "FR4" for convenience. FR4 belongs to so-called EHF (extremely high frequency, also called millimeter wave). FR4 is a temporary name and may be called by another name.

FR4 may be further classified. For example, FR4 may be divided into a frequency range of 70 GHz or less and a frequency range of 70 GHz or more. Alternatively, FR4 may be divided into more frequency ranges, and may be divided in frequencies other than 70 GHz.

Here, the frequency band between FR1 and FR2 is referred to as "FR3" for convenience. FR3 is a frequency band above 7.125 GHz and below 24.25 GHz.

In the present embodiment, FR3 and FR4 are different from the frequency band including FR1 and FR2, and are called different frequency bands.

Particularly, as described above, in a high frequency band such as FR4, an increase in phase noise between carriers becomes a problem. This may require application of a larger (wider) SCS or a single carrier waveform.

Also, a narrower beam (i.e., a larger number of beams) may be required due to increased propagation loss. In addition, since it is more sensitive to PAPR and power amplifier nonlinearity, a greater (wider) SCS (and/or fewer FFT points), a PAPR reduction mechanism, or a single carrier waveform may be required.

In order to address these issues, in this embodiment, when using a band exceeding 52.6 GHz, Cyclic Prefix-Orthogonal Frequency Division Multiplexing (CP-OFDM)/Discrete Fourier Transform having a larger Sub-Carrier Spacing (SCS)—Spread (DFT-S-OFDM) can be applied.

However, the larger the SCS, the shorter the symbol/Cyclic Prefix (CP) period and the slot period (when the 14 symbol/slot configuration is maintained).

Figure 3:
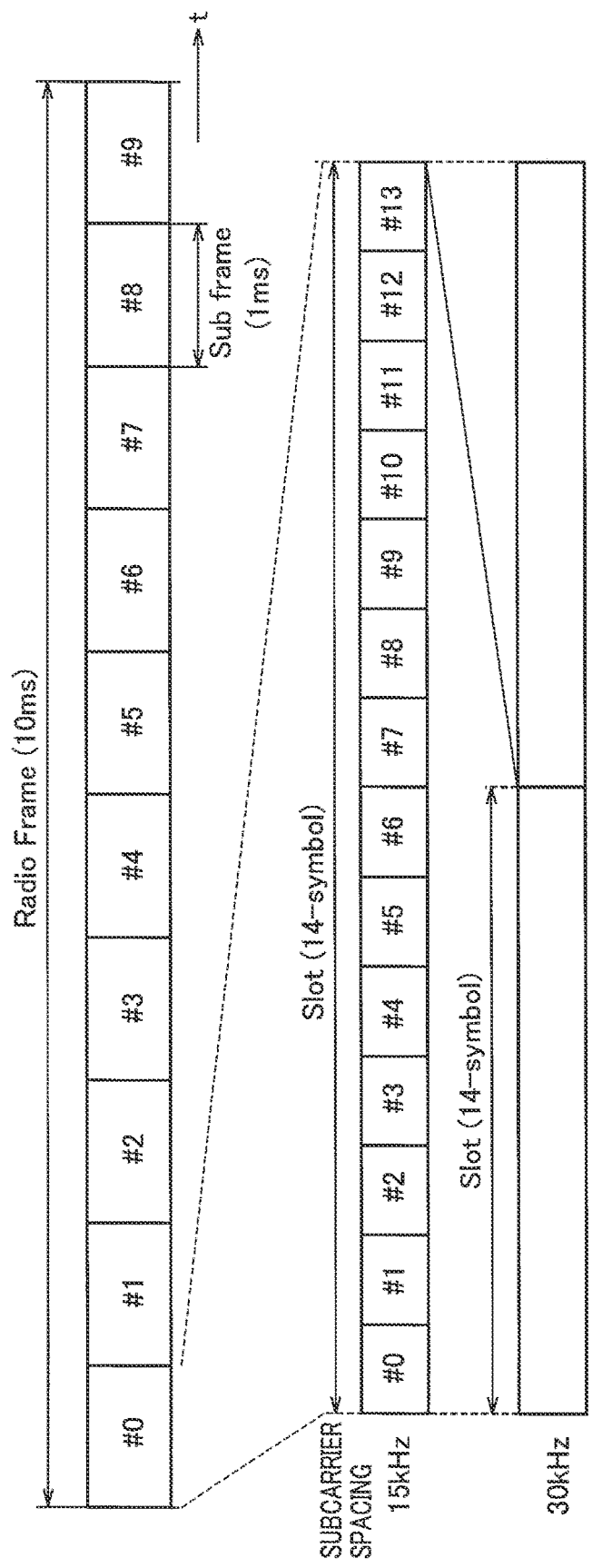
FIG. 3 is a diagram illustrating a configuration example of a radio frame, a subframes, and slots used in the radio communication system 10.

FIG. 3 shows a configuration example of a radio frame, subframes, and slots used in the radio communication system 10. Table 1 shows the relationship between the SCS and the symbol period.

TABLE 1

| SCS | 15 kHz | 30 kHz | 60 kHz | 120 kHz | 240 kHz | 480 kHz | 960 kHz |
|---|---|---|---|---|---|---|---|
| Symbol Period (Unit: μs) | 66.6 | 33.3 | 16.65 | 8.325 | 4.1625 | 2.08125 | 1.040625 |

As shown in Table 1, when the 14 symbol/slot configuration is maintained, the symbol period (and slot period) becomes shorter as the SCS becomes larger (wider). The SS/PBCH Block (SSB) time domain period is also shortened.

Figure 4:
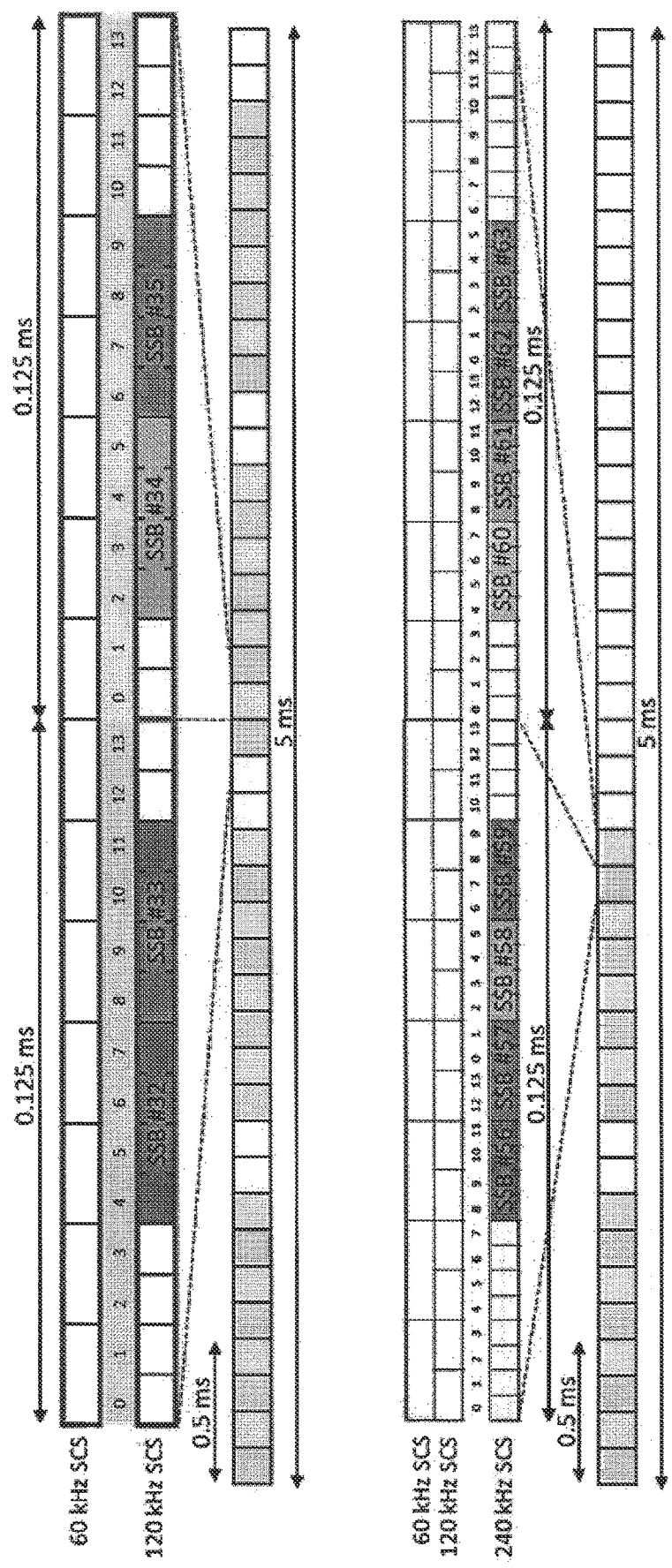
FIG. 4 is a diagram showing a configuration example of SSB burst.

FIG. 4 shows a configuration example of SSB burst. The SSB is a block of a synchronization signal/broadcast channel composed of Synchronization Signal (SS) and PBCH (Physical Broadcast CHannel). Mainly, UE 200 is periodically transmitted to perform cell ID and reception timing detection at the start of communication. In 5G, the SSB is also used to measure a reception quality of each cell.

In the case of Release 15, the following contents are defined regarding SSB setting of a serving cell. Specifically, 5, 10, 20, 40, 80, and 160 milliseconds are defined as the transmission period (periodicity) of the SSB. Note that, the UE 200 for initial access is assumed to have a transmission period of 20 milliseconds.

The network (NG-RAN20) notifies the UE 200 of SSB index indication (ssb-PositionsInBurst) actually transmitted to the UE 200 through system information (SIB1) or signaling in a radio resource control layer (RRC).

Specifically, in the case of FR1, the same is notified by 8-bit bitmap of RRC and SIB1. Further, in the case of FR2, notified by 64-bit bitmap of RRC, 8-bit bitmap in a group, and 8-bit group bitmap of SSB1.

In addition, as explained above, when dealing with FR4 (high frequency band) and the like, in order to address the issue of the wide bandwidth and large propagation loss, it is necessary to generate a narrow beam by using a large antenna with many antenna elements. That is, a large number of beams are required to cover a certain geographical area.

In case of Release 15 (FR2), the maximum number of beams used for SSB transmission is 64; however, it is preferable to expand the maximum number of beams (e.g., 256) to cover a certain geographical area with a narrow beam.

Therefore, in the present embodiment, the maximum number of beams used for SSB transmission is expanded to 256. For this reason, the number of SSBs is 256, and an index (SSB index) for identifying SSBs is a value after #64.

Figure 5:
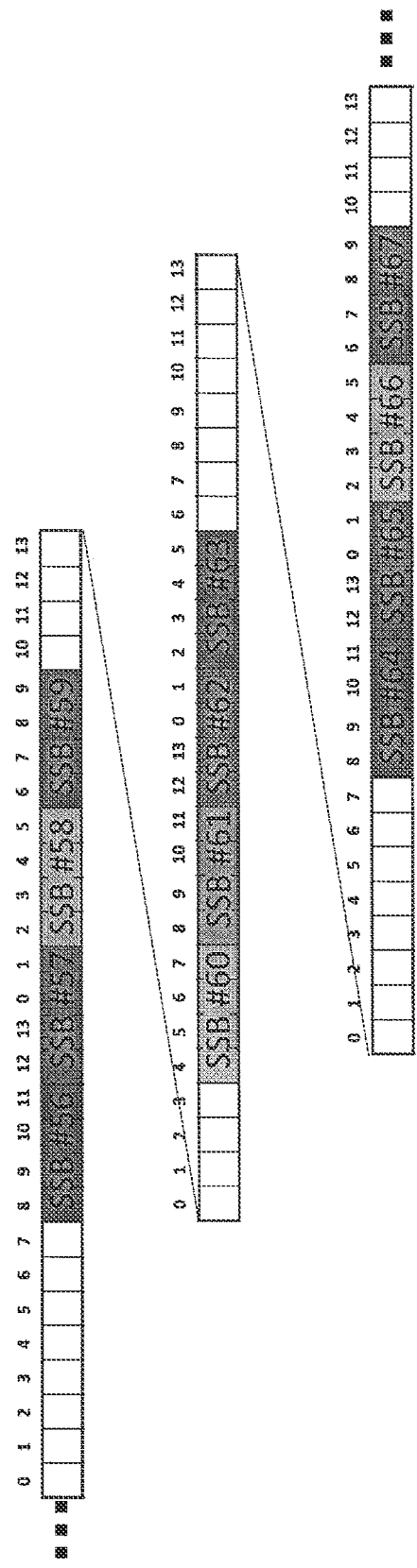
FIG. 5 is a diagram illustrating a partial arrangement example of SSBs when the number of SSBs is expanded to a value exceeding 64.

FIG. 5 shows a partial arrangement example of SSBs when the number of SSBs is expanded to a value exceeding 64. Specifically, FIG. 5 shows a state in which SSBs having an SSB index of #64 or later are added to the configuration example of the SSB burst shown in FIG. 4. Note that when a larger SCS is applied, as shown in Table 1, the symbol periods may be different.

As shown in FIG. 5, the SSB can have a value after #64. In the present embodiment, an explanation has been given below assuming that the SSB index range is 0 to 255. However, the value of the SSB index and the range of the SSB index are not particularly limited to that mentioned here. That is, the number of SSBs may exceed 256, may exceed 64 and may be less than 256.

Figure 6:
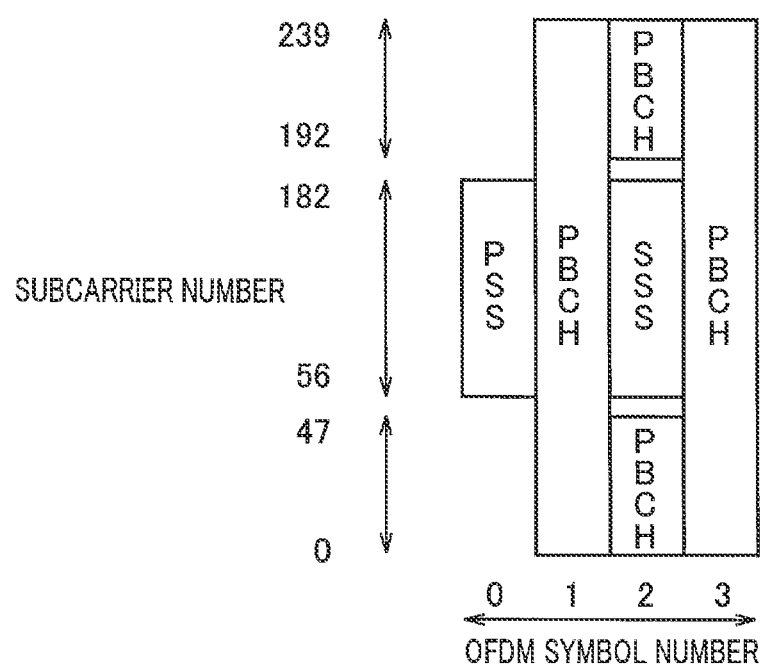
FIG. 6 is a diagram illustrating a configuration example of a synchronization signal block (SSB).

FIG. 6 shows a configuration example of the synchronization signal block (SSB). As shown in FIG. 6, the SSB is composed of a synchronization signal (SS) and a downlink physical broadcast channel (PBCH).

The SS is composed of a primary synchronization signal (PSS: Primary SS) and a secondary synchronization signal (SSS: Secondary SS).

PSS is a known signal that UE 200 first tries to detect in a cell search procedure. SSS is a known signal transmitted to detect a physical cell ID in the cell search procedure.

PBCH includes a radio frame number (SFN: System Frame Number) and an index and the like for identifying a symbol position of multiple SS/PBCH blocks in a half frame (5 milliseconds) that is the information required by the UE 200 when establishing frame synchronization with the NR cell formed by the gNB 100 after detection of SS/PBCH block.

The PBCH can also include system parameters necessary for receiving the system information (SIB). Further, the SSB includes a broadcast channel demodulation reference signal (DMRS for PBCH). DMRS for PBCH is a known signal transmitted to measure the radio channel state for PBCH demodulation.

Figure 7:
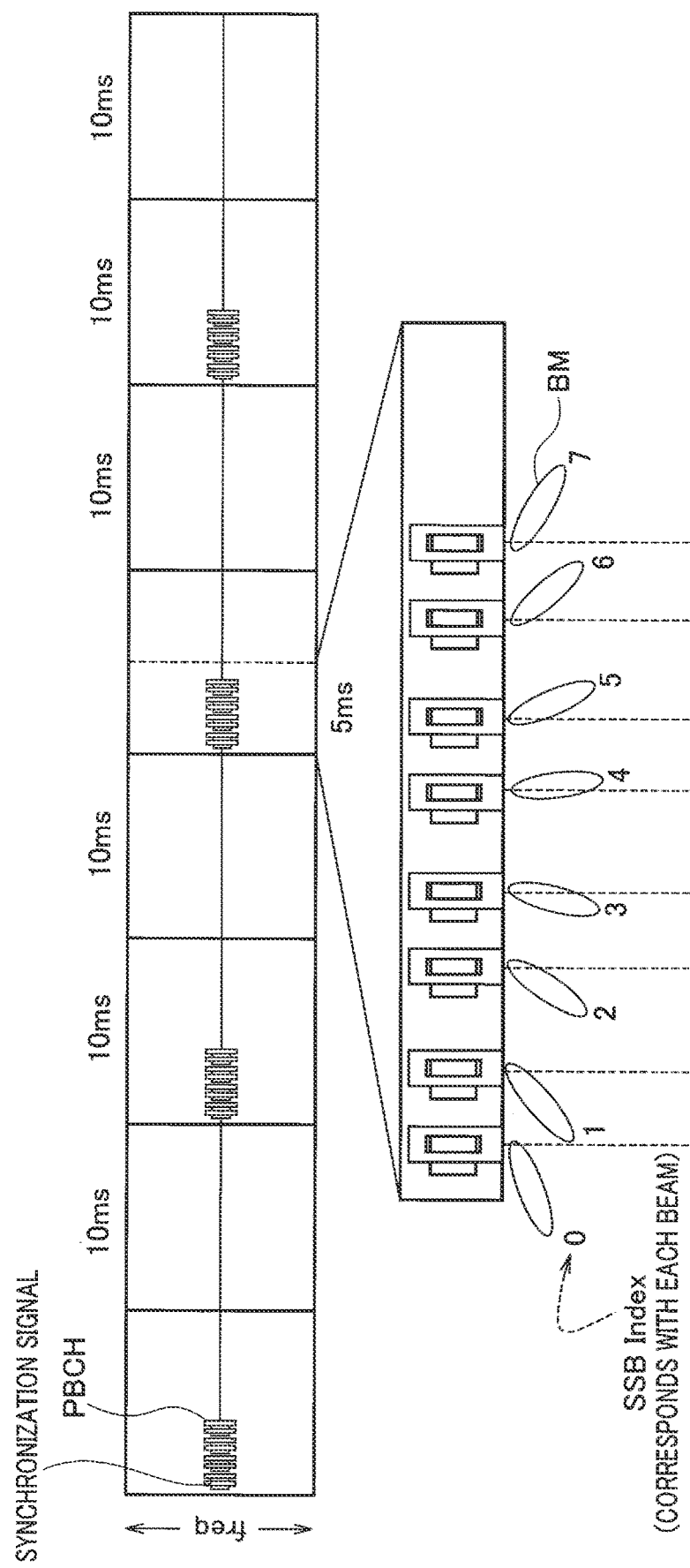
FIG. 7 is an explanatory diagram of a relationship, on a radio frame, between an example of allocation of the SSB and a beam BM.

FIG. 7 is an explanatory diagram showing a relationship between SSB allocation and a beam BM on a radio frame. As explained above, SSB, specifically, the synchronization signal (PSS/SSS) and PBCH shown in FIG. 6, is transmitted in either the first half or the second half of each radio frame (5 milliseconds) (FIG. 7 shows an example of transmission in the first half frame). Also, the terminal assumes that each SSB is associated with a different beam BM. That is, the terminal assumes that each SSB is associated with a beam BM having a different transmission direction (coverage). Thereby, the UE 200 residing in the NR cell can receive one of the beams BM, acquire the SSB, and start the initial access and SSB detection/measurement.

Note that SSB transmission patterns vary depending on SCS, frequency range (FR), or other parameters. Also, not all the SSBs need to be transmitted. That is, depending on network requirements and conditions, only a small number of SSBs can be selectively transmitted, and which SSBs are transmitted and which SSBs are not transmitted can be notified to the UE 200.

The transmission pattern of SSB is notified to UE 200 by the RRC Information Element (IE) called ssb-PositionsInBurst described above.

Figure 8:
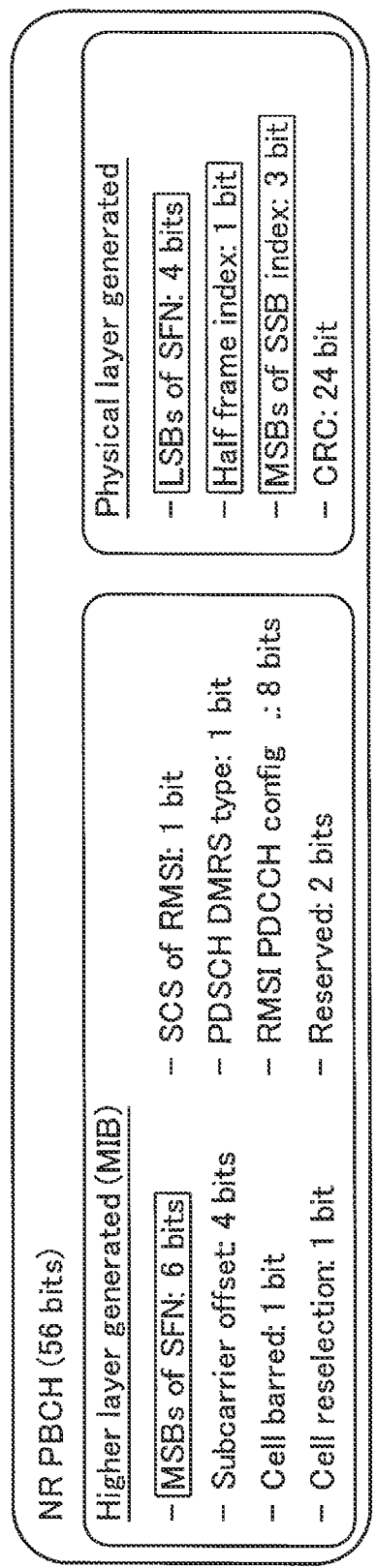
FIG. 8 is a diagram illustrating a configuration example of PBCH of NR.

FIG. 8 shows a configuration example of PBCH of NR. As shown in FIG. 8, parameters sent via PBCH include SSB index (SSB index), a half-frame index, SFN Most Significant Bit (MSB)/Least Significant Bit (LSB), and the like.

Among these, the SSB index is defined as below:
Value: 0 to L−1 (L: maximum SSB number)
When L=4, 2 bits of DMRS sequence are used
When L=8, 3 bits of DMRS sequence are used
When L=64, 3 bits of DMRS sequence are used as LSB, 3 bits of PBCH L1 (PHY) are used as MSB The half-frame index is 1 bit of PBCH L1, and SFN (10 bits) uses 6 bits of the PBCH payload generated by the upper layer (MIB: Master Information Block) as MSB, and uses 4 bits of the PBCH payload generated by PBCH L1 as LSB.

These pieces of information are information related to time (time domain period), and are indicated by a solid line box in FIG. 8.

(2) Functional Block Configuration of Radio Communication System

Next, a functional block configuration of the radio communication system 10 will be described. Specifically, the functional block configuration of the UE 200 will be described.

Figure 9:
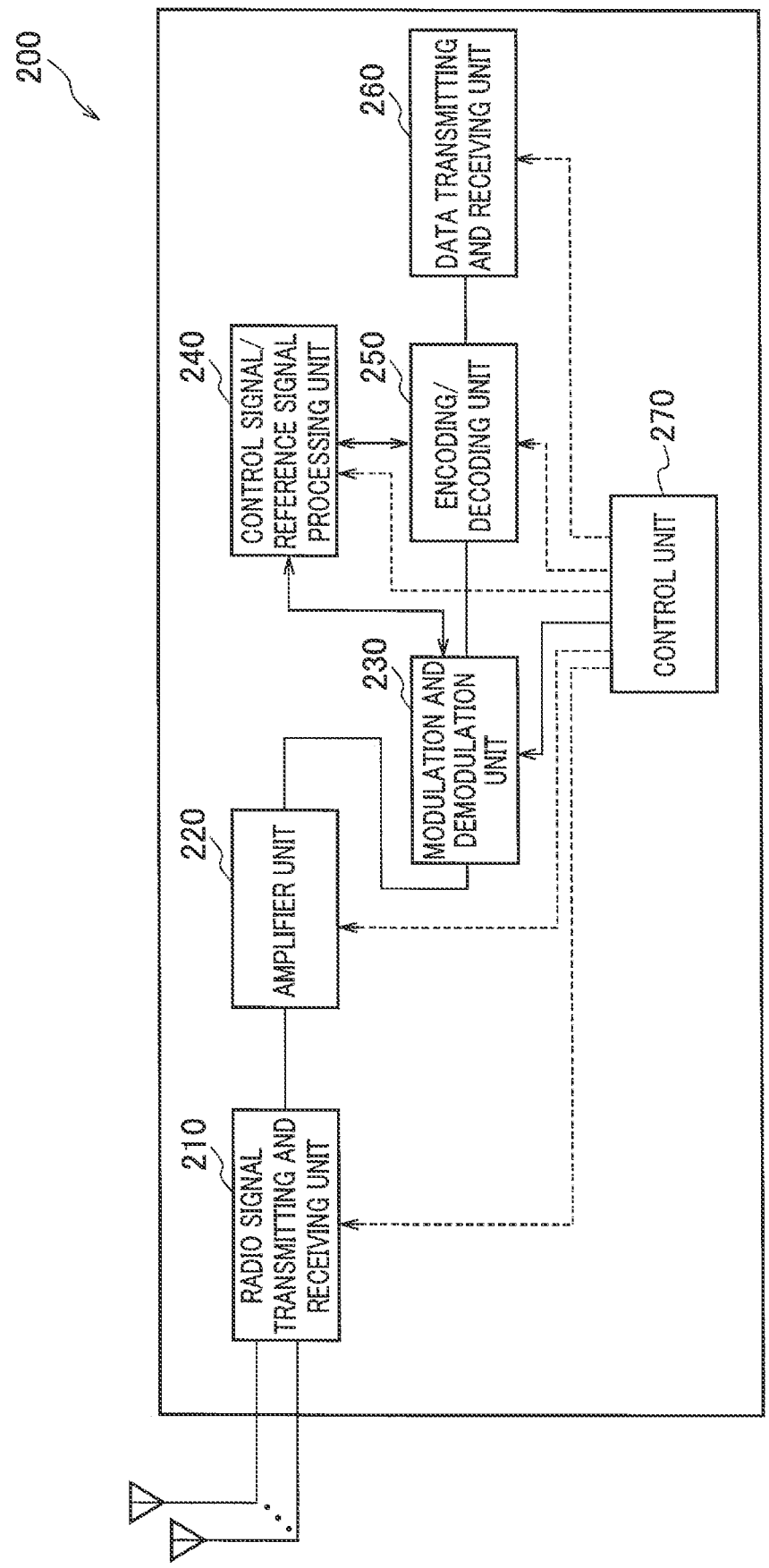
FIG. 9 is a functional block diagram of UE 200.

FIG. 9 is a functional block diagram of the UE 200. As shown in FIG. 9, the UE 200 includes a radio signal transmitting and receiving unit 210, an amplifier unit 220, a modulation and demodulation unit 230, a control signal/reference signal processing unit 240, an encoding/decoding unit 250, a data transmitting and receiving unit 260, and a control unit 270.

The radio signal transmitting and receiving unit 210 transmits/receives a radio signal according to NR. The radio signal transmitting and receiving unit 210 corresponds to Massive MIMO, CA that bundles a plurality of CCs, and DC that performs communication simultaneously between the UE and each of the two NG-RAN Nodes.

Further, the radio signal transmitting and receiving unit 210 may transmit/receive a radio signal using a slot having a larger number of symbols than when FR1 or FR2 is used. Note that the number of symbols is specifically the number of OFDM symbols constituting the slot shown in FIG. 3.

For example, the radio signal transmitting and receiving unit 210 can transmit and receive a radio signal by using a slot having a 28 symbol/slot configuration.

In the present embodiment, the radio signal transmitting and receiving unit 210 constitutes the receiving unit that receives the synchronization signal block, specifically SSB (SS/PBCH Block), in one or a plurality of frequency ranges, specifically, different frequency bands different from the frequency bands including FR1 and FR2, that is, in FR3 and FR4.

Specifically, the radio signal transmitting and receiving unit 210 can receive at least one of a plurality of SSBs transmitted from the network by using the same time position or the same frequency position and having different indexes for identifying SSBs.

Note that different indexes for identifying SSBs may be interpreted as different pseudo-colocation (QCL) assumptions. That is, the radio signal transmitting and receiving unit 210 (UE 200) can receive at least one of a plurality of SSBs having different QCL assumptions.

QCL means that, for example, when the characteristics of the channel carrying the symbol on one antenna port can be inferred from the channel carrying the symbol on the other antenna port, the two antenna ports are in the same place in a pseudo manner.

In addition, it can be interpreted that SSBs with the same SSB index are assumed to be QCL, and other SSBs (that is, different SSB indexes) should not be assumed to be QCL. Note that QCL may be referred to as quasi-collocation.

In the present embodiment, the maximum number of SSBs (L) is expanded to 256, and as described later, the network (gNB 100) can transmit a plurality of SSBs in the same time position (may be read as time resource, time domain, and the like), or in the same frequency position (may be read as frequency resource, frequency band, frequency domain, and the like).

The radio signal transmitting and receiving unit 210 can receive at least one of the plurality of SSBs transmitted at the same time position or frequency position (that is, can receive a plurality of SSBs).

As will be described later, a plurality of SSBs transmitted from the network can constitute a plurality of synchronization signal block sets (SSB sets) (see FIGS. 11 to 13). Further, the plurality of synchronization signal block sets transmitted at the same time position are synchronized with each other in the time direction, and can be transmitted at the same timing.

The radio signal transmitting and receiving unit 210 can receive at least one of a plurality of synchronization signal block sets or receive a plurality of synchronization signal block sets.

The amplifier unit 220 includes a Power Amplifier (PA)/Low Noise Amplifier (LNA) or the like. The amplifier unit 220 amplifies the signal output from the modulation and demodulation unit 230 to a predetermined power level. The amplifier unit 220 amplifies the RF signal output from the radio signal transmitting and receiving unit 210.

The modulation and demodulation unit 230 executes data modulation/demodulation, transmission power setting, resource block allocation, and the like for each predetermined communication destination (gNB 100 or other gNB).

As explained above, in the present embodiment, CP-OFDM and DFT-S-OFDM can be applied. In the present embodiment, DFT-S-OFDM can be used not only for uplink (UL) but also for downlink (DL).

The control signal/reference signal processing unit 240 executes processing related to various control signals transmitted/received by the UE 200 and processing related to various reference signals transmitted/received by the UE 200.

Specifically, the control signal/reference signal processing unit 240 receives various control signals transmitted from the gNB 100 via a predetermined control channel, for example, a control signal of the radio resource control layer (RRC). The control signal/reference signal processing unit 240 transmits various control signals to the gNB 100 via a predetermined control channel.

The control signal/reference signal processing unit 240 executes processing by using reference signals (RS) such as demodulation reference signal (DMRS) and phase tracking reference signal (PRTS).

DMRS is a known reference signal (pilot signal) for estimating a fading channel used for data demodulation between a base station specific for a terminal and the terminal. PTRS is a terminal-specific reference signal for the purpose of estimating phase noise which is an issue in the high frequency band.

The reference signal includes, apart from DMRS and PTRS, Channel State Information-Reference Signal (CSI-RS) and Sounding Reference Signal (SRS).

A channel includes a control channel and a data channel. A control channel includes PDCCH (Physical Downlink Control Channel), PUCCH (Physical Uplink Control Channel), RACH (Random Access Channel, Downlink Control Information (DCI) including Random Access Radio Network Temporary Identifier (RA-RNTI)), and Physical Includes Broadcast Channel (PBCH).

A data channel includes PDSCH (Physical Downlink Shared Channel), PUSCH (Physical Downlink Shared Channel), and the like. Data means data transmitted via a data channel.

The encoding/decoding unit 250 executes data division/concatenation and channel coding/decoding for each predetermined communication destination (gNB 100 or other gNB).

Specifically, the encoding/decoding unit 250 divides the data output from the data transmitting and receiving unit 260 into pieces of a predetermined size, and performs channel coding on the pieces of the data. The encoding/decoding unit 250 decodes the data output from the modulation and demodulation unit 230 and connects the decoded data.

The data transmitting and receiving unit 260 transmits and receives Protocol Data Unit (PDU) and Service Data Unit (SDU). Specifically, the data transmitting and receiving unit 260 executes PDU/SDU assembly/disassembly and the like in multiple layers (such as medium access control layer (MAC), radio link control layer (RLC), and packet data convergence protocol layer (PDCP)). The data transmitting and receiving unit 260 performs data error correction and retransmission control based on hybrid ARQ (Hybrid automatic repeat request).

The control unit 270 controls each functional block constituting the UE 200. Particularly, in the present embodiment, the control unit 270 can calculate a frame timing of a radio frame from at least any of the plurality of received synchronization signal block sets (SSB sets). In addition, the control unit 270 performs access to the network by using the SSB.

Specifically, the control unit 270 uses a parameter included in the SSB received via the radio signal transmitting and receiving unit 210 to execute initial access to the network and measurement processing using the SSB. More specifically, the control unit 270 controls other functional blocks to perform acts such as detection of a synchronization signal (SS), acquiring of broadcast information, establishment of a connection by random access, and measurement of RSRP (Reference signal received power).

Note that, the "broadcast information" mentioned here includes restriction information, common channel information, random access channel information, and the like required by the UE 200 to perform the connection procedure to the NR cells, and this information is broadcast at once for each cell.

(3) Operation of Radio Communication System

Next, an operation of the radio communication system 10 will be described. Specifically, an operation relating to transmission of a synchronization signal block (SSB) by the gNB 100 and an operation relating to reception of the synchronization signal block by the UE 200 will be described.

The following operation example shows a case where the maximum number of SSBs is 256. In the following operation examples, a different frequency band (FR3, FR4) different from FR1/FR2 is assumed (however, application to other FRs is not hindered). Even when the number of SSBs increases, the object is to suppress the overhead concerning the signaling of SSB, reduce the data scheduling delay of the UE 200, reduce the time of SSB detection and measurement and power consumption.

(3.1) Operation Example 1

In this operation example, the network (gNB 100) can simultaneously transmit a plurality of SSBs. Specifically, the network transmits a synchronization signal block set (SSB set) including a plurality of SSBs at the same position in the time direction or the frequency direction.

Figure 10A:
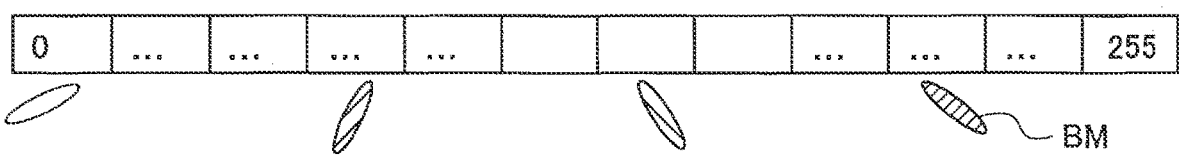
FIG. 10A is a diagram illustrating a configuration example of SSB burst when 256 SSBs are transmitted sequentially and not simultaneously.
Figure 10B:
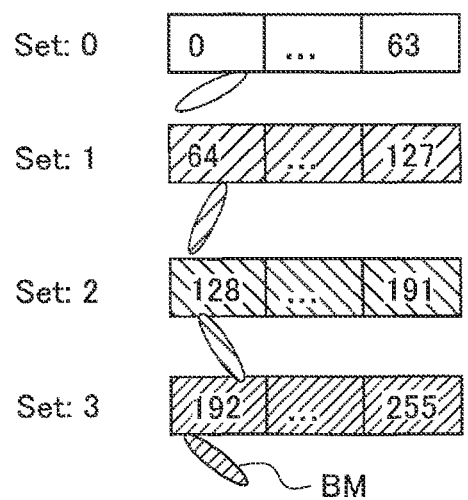
FIG. 10B is a diagram illustrating a configuration example of SSB burst when a plurality of SSBs is simultaneously transmitted according to Operation Example 1.

FIG. 10A shows a configuration example of SSB burst when 256 SSBs are transmitted sequentially and not simultaneously. FIG. 10B shows a configuration example of SSB burst when a plurality of SSBs are transmitted simultaneously according to Operation Example 1.

The configuration example shown in FIG. 10A shows a concept in the case of transmitting 256 SSBs, that is, 256 beams BM by time division (TDM) beam sweeping. Among the 256 SSBs, 8 bits ($2^8$) are required as the SSB index in order to identify which SSB is detected.

The configuration example shown in FIG. 10B represents a case when the maximum number of SSBs (M) in the SSB set is 64 and the number of SSB sets (N) is 4. Specifically, 0 to 255 may be used for the SSB index, and 0 to 3 may be used for the index of the SSB set.

Thus, the SSBs (maximum number: L) in the SSB burst can be classified into different SSB sets. Note that SSB set may be called by another name such as SSB group.

As shown in FIG. 10B, multiple SSBs having different SSB indexes in the SSB set may be transmitted at different positions in the time direction or the frequency direction. A plurality of SSBs included in different SSB sets may be transmitted at the same position in the time direction or the frequency direction.

In the example shown in FIG. 10B, SSB set 0 includes SSBs having SSB indexes of 0 to 63. Similarly, SSB set 1 includes SSB with an SSB index of 64 to 127, SSB set 2 includes SSB with an SSB index of 128 to 191, and SSB set 3 includes SSB with an SSB index of 192 to 255. That is, the value of the SSB index included in each SSB set may be different for each SSB set.

For example, SSBs with SSB index=0, 64, 128, 192 can be transmitted at the same position. As shown in FIG. 10B, the beam BM associated with the SSB having the SSB index preferably has a different transmission direction so as to cover all directions of the NR cell.

For example, each SSB set is an image corresponding to an antenna panel that forms a beam BM. By using a plurality of antenna panels for transmission of different SSB sets, a plurality of SSBs can be transmitted simultaneously by different beams BM. This operation example can also be applied to analog beam forming as defined in Release 15.

In this operation example, the following options may be defined.

Option 1

The number (N) of SSB sets (SSB groups) is defined in advance in 3GPP specifications for each frequency band (BW), or is notified by MIB or SIB. N may be notified by RRC when the UE 200 is in a connected state (RRC_connected). The maximum number of SSBs (M) included in each SSB set can be expressed as M=L/N.

In this option, each gNB may have different levels of capability (different numbers of transmitted SSB beams) for transmission of a plurality of SSBs (beam BM).

Option 2

Among the plurality of the SSB sets, the maximum number of SSBs (M) included in a specific SSB set (first set) is fixed in advance in 3GPP specifications for each frequency band (BW), or is notified by MIB or SIB. M may be notified by RRC when the UE 200 is in a connected state (RRC_connected).

Also, among the plurality of the SSB sets, the maximum number of SSBs (M) included in other SSB sets is the same as M except that the maximum number of SSBs (M) in the last set is L mod M.

In this option, M of each SSB set can be specified in the 3GPP specifications for each frequency band, or can be notified by MIB or SIB.

Option 3

The actual number of SSB sets, or the actual number of SSBs transmitted (that is, transmitted simultaneously) in the same position may depend on the gNB implementation, and there may be no explicit instruction from the network.

However, the maximum value of the number (N) of the SSB sets or the maximum number of the SSBs transmitted at the same position may be defined in the 3GPP specifications for each frequency band.

Option 4

Among the plurality of the SSB sets, in the same manner as in ssb-PositionsInBurst of Release 15, the actual number of SSBs included in the first SSB set (or each SSB set) in time (or the actual SSB index transmitted) may be notified by MIB, SIB, or RRC.

(3.2) Operation Example 2

In this operation example, a time synchronization method when using the SSB burst configuration similar to Operation Example 1 described above will be described.

(3.2.1) Operation Example 2-1

When the maximum number of SSBs (L) exceeds 64, more bits (X bits) are required for displaying the SSB index than in the case of L=64 as defined in Release 15. As explained above, In Release 15/16, 3 bits of DMRS sequence are used for LSB and 3 bits of PBCH L1 (PHY) are used for MSB; however, when L=256, for SSB index display, additional 2 bits of MSB are required.

The bit can be secured by any of the below options.

Option 1: For the additional X bits, upper layer generated payload in PBCH (MIB) is used Option 2: For additional X bits, physical layer information generated for PBCH are used For example, PBCH L1 (PHY) can be used in the same way as the 3 bits of MSB of FR2 when L=64.

Option 3: DMRS sequence is used for some of the existing 6 bits and the additional X bits (e.g., more than 3 bits), or for some of the bits (e.g., more than 3 bits) L1 (PHY) is used In Option 3, a new RS sequence (for example, a reference signal other than PBCH-DMRS, or a Tertiary Synchronization Signal (TSS)) may be used for some bits. Further, as in Option 1, for some or the remaining bits, the upper layer generation payload in the PBCH (MIB) may be used.

Option 4: No additional X bits are shown (may be shown implicitly)

Options 1 to 3 may be operated as below:

For high frequency band such as FR4, the payload size of PBCH (or MIB) may be increased due to the additional indication described above For the high frequency band such as FR4, the payload size of PBCH (or MIB) does not need to be increased, and the reserved bits are reused for the additional indication described above For the high frequency bands such as FR4, the payload size of PBCH (or MIB) may not increase and some existing PBCH (or MIB) bits are not used for their original purpose but used for the additional display mentioned above In this case, it may be further operated as below:

(For PBCH payload outside MIB): When the terminal (UE) assumes fixed LSB of SFN in the high frequency band like FR4 (i.e., high frequency band like FR4 where SFN including SSB is limited to a predetermined value), some LSBs of SFN are used for the additional display as described above (MSB of SSB index and the like)

(For MIB): At least some of the SSB subcarrier offset bits are used for the above-mentioned additional indication (MSB of SSB index and the like); however, the terminal (UE) assumes a fixed or predetermined range of SSB subcarrier offset (for example, the minimum carrier bandwidth (CBW) in the high frequency band such as FR4 is limited)

(For MIB): At least some of PDCCH-ConfigSIB1 bits are used for the additional indications described above (such as the MSB of the SSB index)

The following points should also be noted:

The number of X bits in the new MSB for different frequency bands can be different The X bit values in one SSB set may be the same.

For example, Set 0 is 00, Set 1 is 01, Set 2 is 10, Set 3 is 11, and so on.

Except for the X bits of MSB for displaying the SSB index, all other time-related information in the PBCH transmitted from different SSB sets at the same time may be assumed to be the same.

Figure 11:
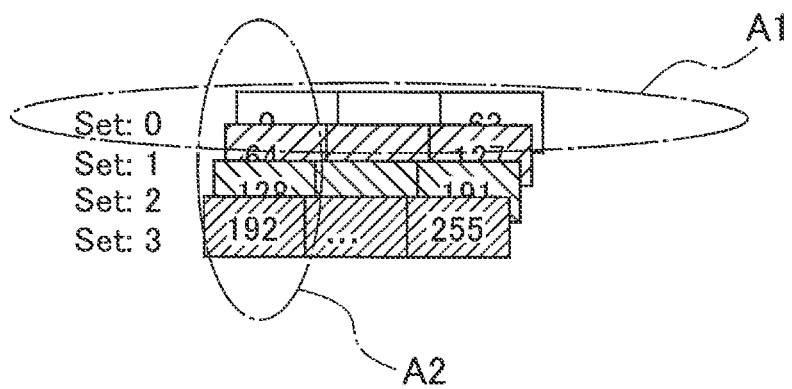
FIG. 11 is an explanatory diagram (part 1) of a terminal operation related to SSB burst according to Operation Example 2.

FIG. 11 is an explanatory diagram (part 1) of a terminal operation related to the SSB burst according to Operation Example 2. The configuration of the SSB burst shown in FIG. 11, specifically, the number of SSBs included in the SSB set (M) and the value of the SSB index are the same as those in FIG. 10B.

The values of the X bits of the MSB for the above-described additional SSB index is the same (for example, "00") in the same SSB set (see A1 in the figure).

On the other hand, the values of the X bits of the MSB for the additional SSB index are different between the different SSB sets (see A2 in the figure). Except for the X bits of MSB, other time-related information, specifically, the information enclosed within a solid line box shown in FIG. 8 may all be the same.

(3.2.2) Operation Example 2-2

When using the SSB burst configuration shown in FIG. 11, the terminal (UE) detects a plurality of the SSB indexes at the same time, and upon detecting SSB indexes with different values (for example, SSB index=0 and, SSB index=64) there arises an issue of how the terminal establishes the time synchronization.

Therefore, it may be further operated as below:

When SSB index is within (0 to M−1) (assuming M≤64), establishment of time synchronization may be the same as Release 15/16

If the SSB index is larger than (M−1), and assuming that the SSB index is "i", the SSB index timing of I mod M is determined as the time timing of the SSB index "i".

Figure 12:
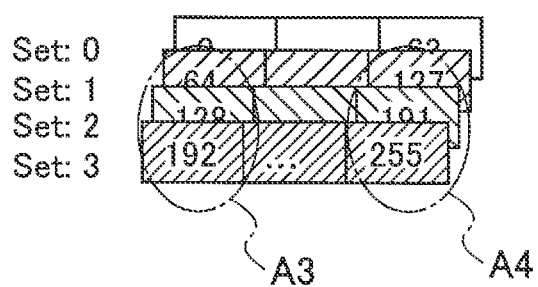
FIG. 12 is an explanatory diagram (part 2) of a terminal operation regarding SSB burst according to Operation Example 2.

FIG. 12 is an explanatory diagram (part 2) of a terminal operation regarding the SSB burst according to Operation Example 2. The structure of the SSB burst shown in FIG. 12, specifically, the number of SSBs (M) included in the SSB set and the value of the SSB index are the same as in FIG. 10B.

For example, SSBs with SSB index=64, 128, 192 (see A3 in the figure) are treated as being the same time as SSBs with SSB index=0 (which may be said deemed considered) Similarly, SSBs with SSB index=127, 191, 255 (see A4 in the figure) are treated as being the same time as SSB with SSB index=63 (which may be said deemed considered)

(3.3) Operation Example 3

In this operation example, like in Operation Example 2, a time synchronization method in the case of using the same SSB burst configuration as in Operation Example 1 will be described.

As explained above, in Release 15/16, 3 bits of DMRS sequence are used for LSB and 3 bits of PBCH L1 (PHY) are used for MSB. Even when L>64, L is limited to 64 in this operation example.

On the other hand, an index of SSB set (which may be referred to as SSB group, hereinafter the same) is defined to identify SSBs transmitted simultaneously. The maximum number of SSB sets (N) can be defined in advance in the 3GPP specifications for each frequency band (BW). For example, it can be set to 2, 3, 4 or the like (the actual number of SSB sets depends on the number of antenna panels of the gNB 100).

The additional X bits is necessary for displaying the SSB set, and for example, when L=256, two additional bits are required.

The bit can be secured by any of the below options.

Option 1: For the additional X bit, an upper layer generated payload in PBCH (MIB) is used Option 2: For the additional X bit, a physical layer information generated for PBCH is used Option 3: For the additional X bit, DMRS sequence is used Option 4: For the additional X bit, a new RS sequence (e.g. TSS) defined other than PBCH-DMRS is used for displaying the SSB set index Option 5: The additional X bit is not shown (may be shown implicitly) (In other words, the SSB set index may not be specified.)

Options 1 and 2 may be operated as below:

In the case of the high frequency band such as FR4, it is allowable to increase the payload size of PBCH (or MIB) to accommodate the transmission of the additional X-bits In the case of the high frequency band such as FR4, the payload size of PBCH (or MIB) does not need to be increased, and reserved bits are reused for the SSB set index In the case of the high frequency band such as FR4, the payload size of PBCH (or MIB) need not be increased and some existing PBCH (or MIB) bits are not used for their original purpose but used for further display of the additional X bits In this case, it may be further operated as below:

(For PBCH payload outside MIB): When the terminal (UE) assumes fixed LSB of SFN in the high frequency band like FR4 (i.e., high frequency band like FR4 where SFN including SSB is limited to a predetermined value), some LSBs of SFN are used for the additional display as described above (index for SSB set and the like)

(For MIB): At least some of the SSB subcarrier offset bits are used for displaying the additional X bits (e.g., SSB set index); however, the terminal (UE) assumes a fixed or a predetermined range of SSB subcarrier offset (for example, the minimum carrier bandwidth (CBW) in the high frequency band such as FR4 is limited)

(For MIB): At least some of PDCCH-ConfigSIB1 bits are used for displaying the additional X bits (e.g. SSB set index) Also, unlike Operation Example 2-2 described above, the terminal (UE) can determine the time by detecting the SSB index (0 to 63).

Figure 13:
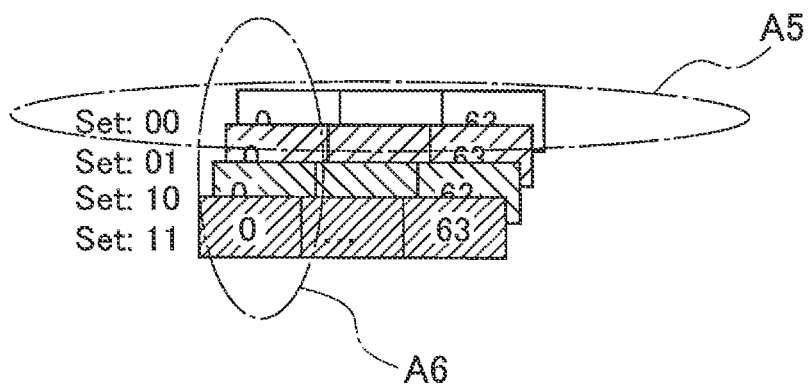
FIG. 13 is an explanatory diagram of a configuration example of SSB burst according to Operation Example 3 and a terminal operation related to the SSB burst.

FIG. 13 is an explanatory diagram of a configuration example of SSB burst according to Operation Example 3 and a terminal operation related to the SSB burst. As shown in FIG. 13, the SSB index included in each SSB set (the SSB index of the SSB transmitted at the same time) is common among the SSB sets.

Specifically, when compared with Operation Example 1 or the like, SSB index=0 to 63 is repeated in each SSB set (see A5 in the figure).

On the other hand, 2 bits, specifically, 00, 01, 10, 11, are used as a set index for identifying the SSB set (see A6 in the figure). Except for the additional bits for the set index, other time-related information, specifically, the information enclosed by the solid line box shown in FIG. 8, may all be the same.

(4) Advantageous Effects

According to the embodiments described above, the following advantageous effects can be obtained. As explained above, the UE 200 receives the SSB in a different frequency band (for example, the high frequency band such as FR4) that is different from the frequency band including FR1 and FR2.

Specifically, the UE 200 can receive at least one of a plurality of SSBs transmitted at the same time from the network, that is, transmitted using the same time position or the same frequency position and having different indexes.

That is, since the UE 200 corresponds to the high frequency band such as FR4, even when the number of SSBs (L) becomes large, one or a plurality of SSBs transmitted simultaneously via the beams BM having different transmission directions can be received.

For this reason, the overhead regarding the signaling of SSB can be suppressed effectively. Furthermore, since a plurality of SSBs can be transmitted simultaneously, the data scheduling delay of the UE 200, SSB detection/measurement time, and power consumption can be reduced.

In the present embodiment, a plurality of SSBs constitute a plurality of SSB sets. The UE 200 can receive at least one of the plurality of SSB sets. For this reason, even when the number of SSBs (L) becomes large, the large number of SSBs can be used efficiently.

In the present embodiment, the SSB index included in each SSB set may be different for each SSB set (see FIG. 11 and the like). Accordingly, it is possible to suppress overhead related to the SSB signaling and reduce data scheduling delay, SSB detection/measurement time, and power consumption while ensuring the distinguishability of SSB alone included in the SSB set.

In the present embodiment, the SSB index included in each SSB set may be common between the SSB sets (see FIG. 13). As a result, while using the existing SSB index (L≤64), it is possible to suppress the overhead related to the SSB signaling and reduce the data scheduling delay, SSB detection/measurement time, and power consumption.

(5) Other Embodiments

Although the contents of the present invention have been described by way of the embodiments, it is obvious to those skilled in the art that the present invention is not limited to what is written here and that various modifications and improvements thereof are possible.

For example, in the above embodiment, a high frequency band such as FR4, that is, a frequency band exceeding 52.6 GHz has been described as an example; however, it is allowable to apply at least one of the above-described operation examples 1 to 3 to other frequency ranges such as FR3.

Further, as explained above, FR4 may be divided into, for example, a frequency range of 70 GHz or less and a frequency range of 70 GHz or more, and the operation example described above can be applied either in the frequency range of 70 GHz or more or the frequency range of 70 GHz or less.

Moreover, the block diagram used for explaining the embodiments (FIG. 9) shows blocks of functional unit. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. For any of the above, as explained above, the realization method is not particularly limited to any one method.

Figure 14:
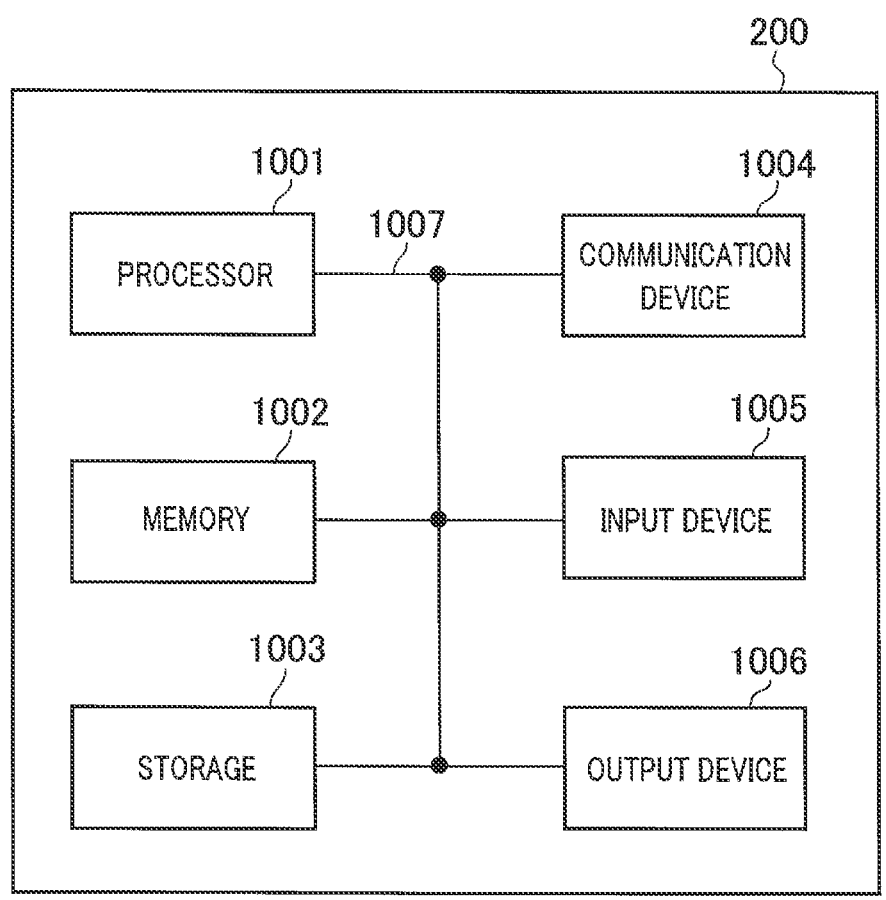
FIG. 14 is a diagram illustrating an example of hardware configuration of the UE 200.

Furthermore, the UE 200 explained above can function as a computer that performs the processing of the radio communication method of the present disclosure. FIG. 14 is a diagram showing an example of a hardware configuration of the UE 200. As shown in FIG. 14, the UE 200 can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

The functional blocks of the UE 200 (see FIG. 9) can be realized by any of hardware elements of the computer device or a desired combination of the hardware elements.

Moreover, the processor 1001 performs computing by loading a predetermined software (computer program) on hardware such as the processor 1001 and the memory 1002, and realizes various functions of the UE 200 by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main memory), and the like. The memory 1002 can store therein a computer program (computer program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, notification information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained;

however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station. A radio frame may be composed of one or more frames in the time domain. Each frame or frames in the time domain may be referred to as a subframe.

A subframe may be further configured by one or more slots in the time domain. The subframe may have a fixed time length (e.g., 1 ms) that does not depend on the numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. PDSCH (or PUSCH) transmitted in a time unit larger than a minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one between a subframe and TTI may be a subframe (1 ms) in existing LTE, or may be shorter than 1 ms (for example, 1 to 13 symbols), or a period longer than 1 ms. Note that, a unit representing TTI may be called a slot, a minislot, or the like instead of a subframe.

Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. Further, the number of slots (the number of minislots) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain. The number of subcarriers included in RB may be, for example, twelve, and the same regardless of the topology. The number of subcarriers included in the RB may be determined based on the neurology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, a common RB may be specified by RB index based on the common reference point of the carrier. PRB may be defined in BWP and numbered within that BWP.

BWP may include UL BWP (UL BWP) and DL BWP (DL BWP). One or a plurality of BWPs may be set in one carrier for the UE.

At least one of the configured BWPs may be active, and the UE may not expect to send and receive certain signals/channels outside the active BWP. Note that "cell", "carrier", and the like in this disclosure may be read as "BWP".

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each apparatus may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining" and "determining" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. In other words, "judgement" and "decision" may include considering some operation as "judged" and "decided". Moreover, "judgment (decision)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
100 gNB
200 UE
210 Radio signal transmitting and receiving unit
220 Amplifier unit
230 Modulation and demodulation unit
240 Control signal/reference signal processing unit
250 Encoding/decoding unit
260 Data transmitting and receiving unit
270 Control unit
BM Beam
1001 Processor
1002 Memory
1003 Storage
1004 Communication device
1005 Input device
1006 Output device
1007 Bus

The invention claimed is:

1. A terminal comprising:
a receiving unit that receives a plurality of synchronization signal block sets each of which includes a plurality of synchronization signal blocks in a frequency band from 52.6 GHz to 114.25 GHz; and
a control unit that performs access to a network by using the synchronization signal block, wherein
the plurality of synchronization signal blocks are transmitted simultaneously from the network by using a same time position or a same frequency position and have different quasi-colocation assumptions, and
synchronization signal block indices, identifying each synchronization signal block, have different values such that an index value associated with one synchronization signal block is different than an index value associated with any other synchronization signal block within all of the plurality of synchronization signal block sets.

2. The terminal as claimed in claim 1, wherein
the control unit derives a frame timing from at least one of the received plurality of synchronization signal block sets.

* * * * *